(12) United States Patent
Cohen et al.

(10) Patent No.: US 8,700,606 B2
(45) Date of Patent: *Apr. 15, 2014

(54) METHODS FOR CALCULATING A COMBINED IMPACT ANALYSIS REPOSITORY

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Netanya (IL); Roy Armoni, Givat Ada (IL)

(73) Assignee: Panaya Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,419

(22) Filed: Oct. 14, 2012

(65) Prior Publication Data

US 2013/0041886 A1    Feb. 14, 2013

Related U.S. Application Data

(63) Continuation of application No. 12/370,690, filed on Feb. 13, 2009, now Pat. No. 8,321,407.

(60) Provisional application No. 61/030,969, filed on Feb. 24, 2008.

(51) Int. Cl.
*G06F 17/30*    (2006.01)

(52) U.S. Cl.
USPC .......................................................... 707/718

(58) Field of Classification Search
None
See application file for complete search history.

(56) References Cited

U.S. PATENT DOCUMENTS

| | | | |
|---|---|---|---|
| 6,223,171 B1 | 4/2001 | Chaudhuri et al. | |
| 6,601,023 B1 * | 7/2003 | Deffler et al. | 703/13 |

* cited by examiner

*Primary Examiner* — Rehana Perveen
*Assistant Examiner* — Alexander Khong

(57) ABSTRACT

Methods for accessing impact analysis repositories and transaction-refinement index for each of the impact analysis repositories. According to the obtained transaction-refinement index, associating the combined repository with information from the most transaction refined impact analysis repository. Associating the combined repository with information from the less transaction refined impact analysis repository in the case of a request to insert or delete a table record for tables that do not contain any impacted transaction in the more transaction refined impact analysis repository. And associating the combined repository with information from the less transaction refined impact analysis repository in the case of a request to update a table record for table columns that do not contain any impacted transaction in the more transaction refined impact analysis repository.

9 Claims, 7 Drawing Sheets

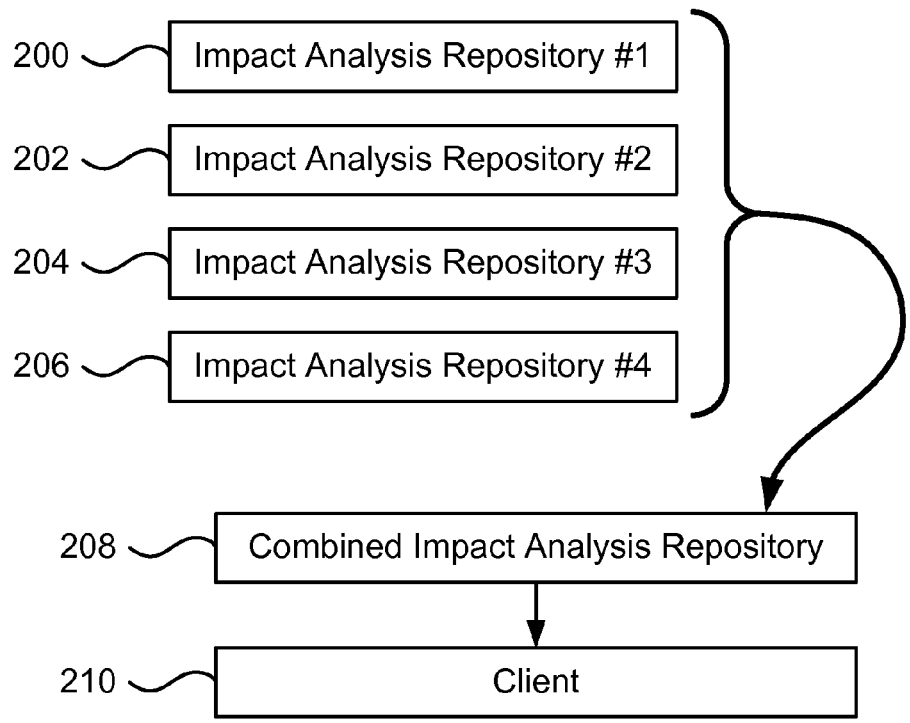

METHODS FOR CALCULATING A COMBINED IMPACT ANALYSIS REPOSITORY

CROSS-REFERENCE TO RELATED APPLICATIONS

This application is a continuation of U.S. patent application Ser. No. 12/370,690, filed on Feb. 13, 2009, which claims the benefit of U.S. Provisional Patent Application No. 61/030,969, filed on Feb. 24, 2008, incorporated herein by reference.

TECHNICAL FIELD

The embodiments of the present invention relate to impact analysis and, more particularly, to methods for calculating a combined impact analysis repository.

BACKGROUND

A computer program may be analyzed by a variety of impact analysis algorithms, which estimates what will be affected in the computer program if a proposed change request is made. Impact-analysis information may be used for planning changes, making changes, accommodating certain types of program changes, and tracing through the effects of changes. Impact analysis provides visibility into the potential effects of changes before the changes are implemented. The accuracy of an impact analysis algorithm may depend on the scenario. Moreover, different impact analysis algorithms may be optimized for different scenarios and may feature different properties, such as (i) rate of matches versus some expected results, also known as probability of detection, (ii) rate of mismatches, also known as "over" or probability of error, and (iii) the number of impact analysis results per transaction.

Complete theoretical descriptions, details, explanations, examples, and applications of code analysis and related subjects are readily available in standard references in the fields of computer science.

BRIEF SUMMARY

One embodiment of the invention discusses a method including the steps of: accessing at least two impact analysis repositories; calculating a combined impact analysis repository from the at least two impact analysis repositories; and utilizing the combined impact analysis repository for supplying better quality impact analysis results.

Another embodiment of the invention discusses a method including the steps of: accessing at least two impact analysis repositories; obtaining a transaction-refinement index for each of the impact analysis repositories; according to the obtained transaction-refinement index, associating the combined repository with information from the most transaction refined impact analysis repository; and associating the combined repository with information from the less transaction refined impact analysis repository in the case of a request to insert or delete a table record for tables that do not contain any impacted transaction in the more transaction refined impact analysis repository; and associating the combined repository with information from the less transaction refined impact analysis repository in the case of a request to update a table record for table columns that do not contain any impacted transaction in the more transaction refined impact analysis repository.

Another embodiment of the invention discusses a method including the steps of: accessing at least two impact analysis repositories reporting impacted transactions and externally-visible output statements impacted in each transaction; obtaining a statement-refinement index for each of the impact analysis repositories; and obtaining a combined impact analysis repository by associating, for each transaction impacted by a predefined change request, the externally visible output statements with the impacted transactions from the more statement-refined impact analysis repository.

Implementation of the methods of the embodiments of the present invention involves performing or completing selected tasks or steps manually, semi-automatically, fully automatically, and/or a combination thereof. Moreover, depending upon actual instrumentation and/or equipment used for implementing the embodiments, several embodiments could be achieved by hardware, by software, by firmware, or a combination thereof. With software, selected functions of the embodiments could be performed by a data processor, such as a computing platform, executing a software instructions or protocols using any suitable computer operating system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 1 is an illustration of a combined impact analysis representation, in accordance with one embodiment of the present invention;

FIG. 2 is an illustration of an impact analysis repository down to the transactions level, in accordance with one embodiment of the present invention;

DETAILED DESCRIPTION

Figure 3:
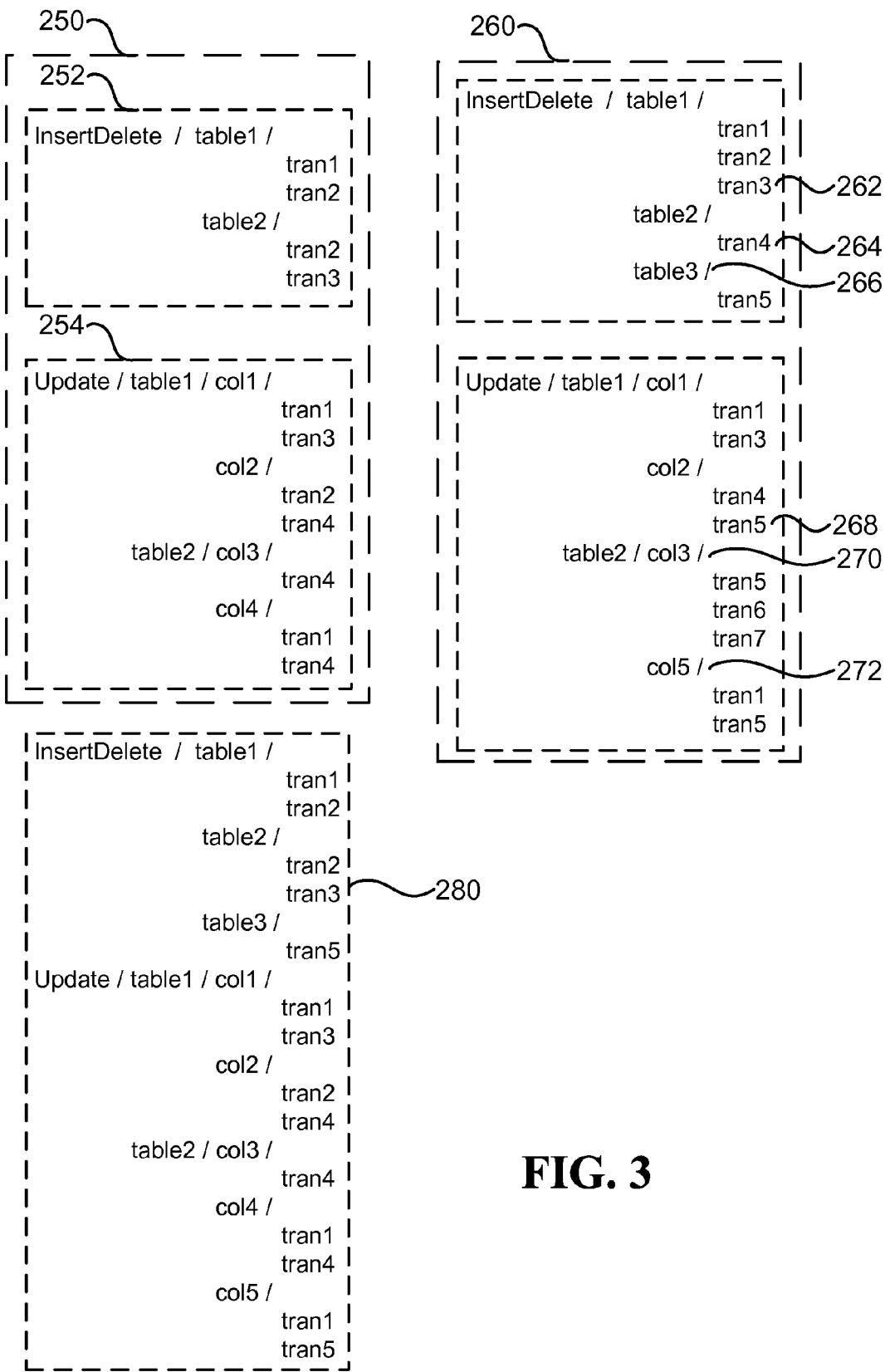
FIG. 3 is an illustration of one transaction-refinement embodiment, in accordance with the present invention.

In the following description, numerous specific details are set forth. However, it is to be understood that the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some flow diagrams operations are described with reference to the embodiments illustrated by the block diagrams. However, it is to be understood that the methods of the flow diagrams could be performed by embodiments of the invention other than those discussed with reference to the block diagrams, and embodiments discussed with reference to the block diagrams could perform operations different than those discussed with reference to the flow diagrams. Moreover, it is to be understood that although the flow diagrams may depict serial operations, certain embodiments could perform certain operations in parallel and/or in different orders than those depicted.

Some of the embodiments of the present invention disclose methods for using the results of at least two different impact analysis algorithms, referred to as impact analysis repositories, and calculating a combined impact analysis repository having a higher quality than the quality of a single impact analysis repository. The impact analysis repositories report impacted transactions. It is to be noted that software programs may be invoked in different contexts, called transaction, and each program may be mapped to one or more transactions.

Usually, there is no single standout threshold for an impact analysis algorithm and there is no single standout impact analysis algorithm. Therefore, in one embodiment, a combination of at least two different impact analysis algorithms is created. In another embodiment, a combination of different thresholds of the same impact analysis algorithm are utilized for obtaining a set of impact analysis results from which a combined repository is to be calculated. Still another embodiment utilizes a combination of different impact analysis algorithms and different thresholds.

In one embodiment, the method utilizes a plurality of impact analysis algorithms, whereby each impact analysis algorithm is optimized for at least one property and/or scenario and may feature different properties. Property examples include, but are not limited to, probability of detection, probability of error, and number of impact analysis results per transaction.

Without limiting the scope of the embodiments, the term "externally-visible output statement" refers to any statement that uses or modifies a state that is external to the internal state of the program. For example: (i) output statements, such as assignments to screen fields and error messages; (ii) a statement in the program at which the control is transferred outside the program, such as, but not limited to, interface connection points in the code, also known as user exit. Specific examples of externally-visible output statements include, but are not limited to: system screens, system reports, user exit, interface to other systems, system flow, tables in the DB, and error messages.

Figure 6:
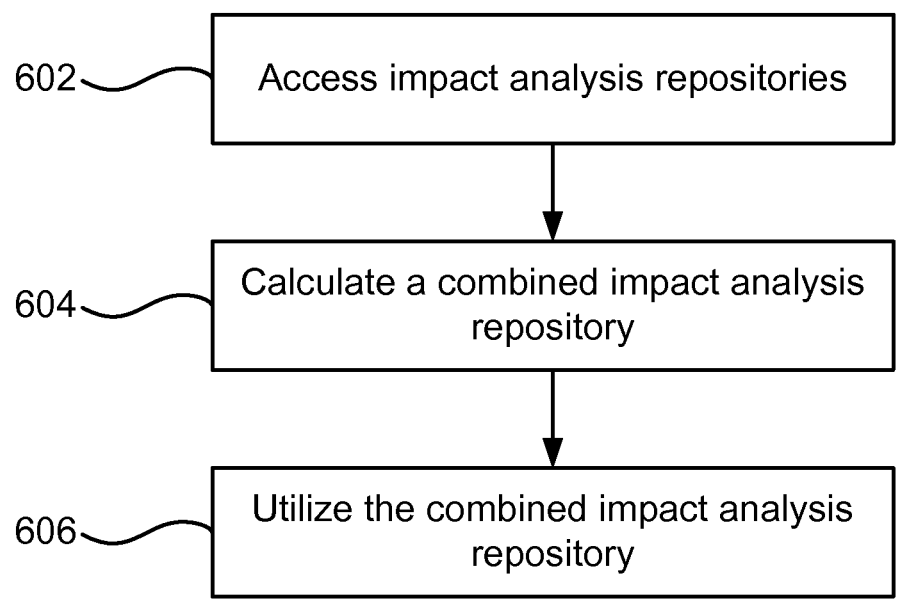
FIGS. 6, 7A, 7B, and 8 illustrate methods in accordance with some embodiments of the present invention.

FIG. 1 and FIG. 6, illustrate one example of using some of the embodiments of the present invention, including the following steps:

In step 602, accessing at least two impact analysis repositories (200, 202, 204, and 206). Examples of impact analysis repository structures include a directory structure and a database structure.

In step 604, calculating a combined impact analysis repository 208, optionally as discussed below, from the at least two impact analysis repositories (200, 202, 204, and 206).

And in step 606, a software client utilizing the combined impact analysis repository 208 using approximately the same interface used for utilizing any of the single impact analysis repositories (200, 202, 204, and 206).

Optionally, the impact analysis repositories (200, 202, 204, and 206) result from impact analysis algorithms which find the transactions that are influenced by a change request. The change request may be requested by a user of the system. In one embodiment, the change request may be either a request to update a table record or a request to insert or delete a table record. It is to be noted that (i) the request to insert or delete a table record adds or removes a whole record from the table, while the request to update a table record updates an existing record, and (ii) optionally, a record contains one or more values for one or more columns of the table.

In other words, when a record is inserted or deleted from a table, all the transactions that are influenced by at least one of the table's columns are impacted by the request to insert or delete a table record. When a record is updated, only the transactions that are influenced by the column changed in the updated record are impacted by the request to update a table record. Alternatively, the request to insert or delete a table record may be handled as a union of request to update each of the table's columns.

In one embodiment, an impact analysis repository includes (i) for each table, a set of transactions impacted by a request to insert or delete a table record to/from that table, and (ii) for each table-column pair, a set of transactions impacted by a request to update a table record referring to that column.

FIG. 2 illustrates an impact analysis repository down to the transactions level. Each instance of an impacted transaction in the repository is associated with a list of impacted elements. The impacted elements are externally-visible output statements, such as, but not limited to, messages, screen fields, screens, tables, user exits, or output statements.

Element 220 illustrates the impacted transactions affected by a request to insert or delete a table record; for each table, the repository includes a list of transactions affected by inserting or deleting a table record to/from that table. Element 222 illustrates the impacted transactions affected by a request to update a table record; for each table, the repository includes a list of columns of the table and a list of transactions affected by updating these columns.

In one embodiment, the user is able to enter feedback about the quality and/or accuracy of the combined impact analysis repository. The feedback may be entered using a specific GUI, such as a drop down menu allowing the user to choose, for example, between "good result" and "mistake".

The combined impact analysis repository may be calculated using one of the following non-limiting embodiments.

In one embodiment, the combined impact analysis repository includes a list of transactions and is calculated using the following transaction-refinement technique.

Accessing at least two impact analysis repositories comprising transactions, and obtaining a transaction-refinement index for each of the impact analysis repositories. Optionally, a first impact analysis repository is considered to be more transaction-refined than a second impact analysis repository if (i) the average number of impacted transactions per database column for a request to update a table record, or (ii) the average number of database tables for a request to insert or delete a table record, in the first impact analysis repository, is smaller than that average number in the second impact analysis repository.

For each table containing an impact of a request to insert or delete a table record in any of the impact analysis repositories, copying to the combined repository the results from the most transaction-refined repository that also contains an impact on predefined transactions. For example, in a case where a first impact analysis repository is considered to be more transaction-refined than a second impact analysis repository, if there is an impact on some transaction in the first impact analysis repository, then the results from the first impact analysis repository are copied to the combined impact analysis repository; otherwise, the results from the second impact analysis repository are copied to the combined impact analysis repository.

For each table column containing an impact of a request to update the table record in any of the impact analysis repositories, copying the results from the most transaction-refined repository that also contains an impact to the combined repository.

FIG. 3 is a non-limiting schematic illustration of the above described transaction-refinement embodiment. Impact analysis repository 250 is more transaction-refined than impact analysis repository 260; therefore, the impact information of repository 250 (i.e. 252 and 254) are copied to the combined impact analysis repository 280. Then, the impact information of 266 and 272 are copied to the combined impact analysis repository 280 because their associated tables do not appear in impact analysis repository 250. As illustrated, the impact information of 262, 264, 268, and 270, are not copied to the combined impact analysis repository 280 because their associated tables already appear in repository 250.

Figure 7A:
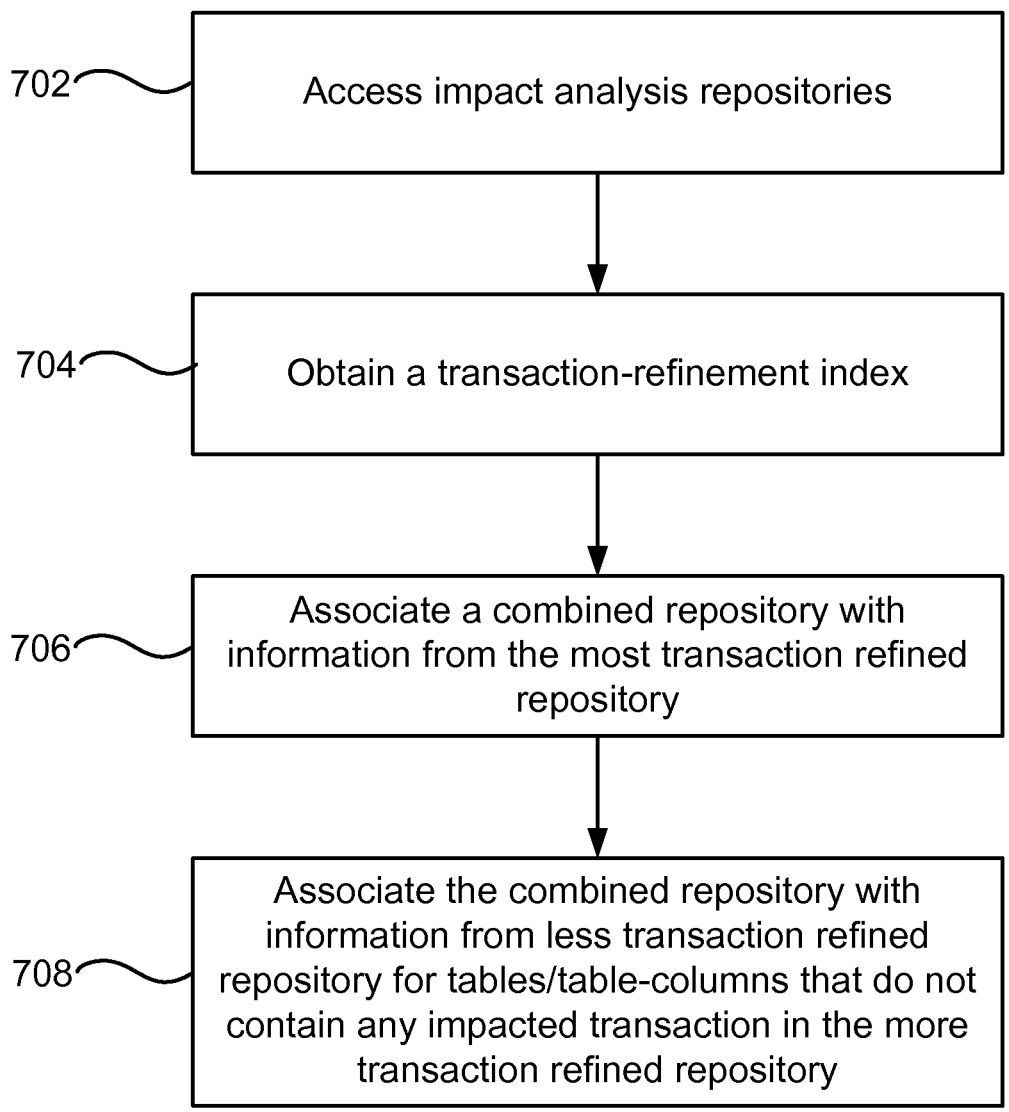

FIG. 7A illustrates one embodiment, including the following steps: In step 702, accessing at least two impact analysis repositories comprising transactions. In step 704, obtaining a transaction-refinement index for each of the impact analysis repositories. In step 706, according to the obtained transaction-refinement index, associating the combined repository with information from the most transaction refined impact analysis repository. And in step 708, associating the combined repository with information from the less transaction refined impact analysis repository in the case of a request to insert or delete a table record for tables that do not contain any impacted transaction in the more transaction refined impact analysis repository; and associating the combined repository with information from the less transaction refined impact analysis repository in the case of a request to update a table record for table columns that do not contain any impacted transaction in the more transaction refined impact analysis repository.

Figure 7B:
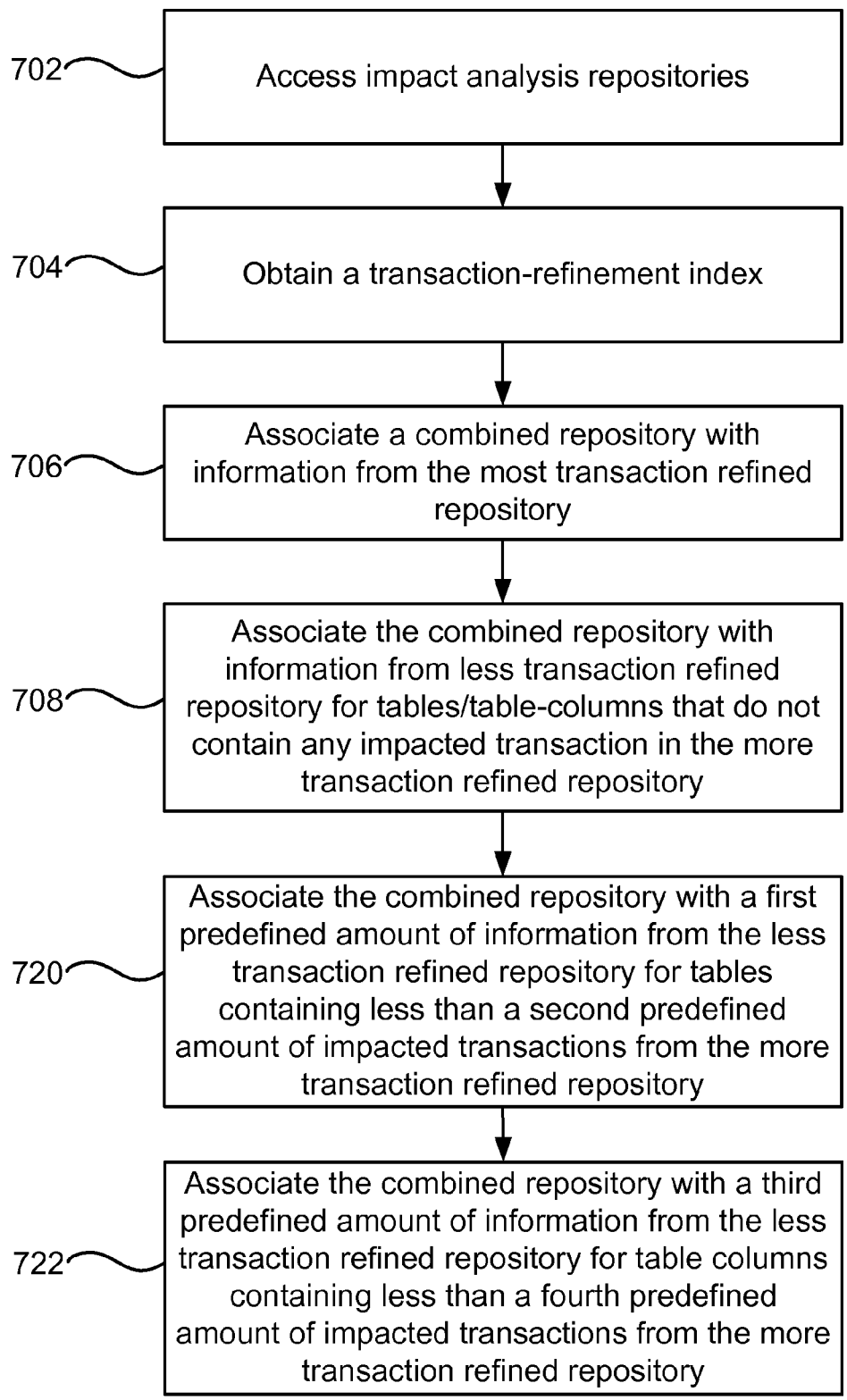

FIG. 7B illustrates one embodiment, including the following steps: In step 702, accessing at least two impact analysis repositories comprising transactions. In step 704, obtaining a transaction-refinement index for each of the impact analysis repositories. In step 706, according to the obtained transaction-refinement index, associating the combined repository with information from the most transaction refined impact analysis repository. In step 708, associating the combined repository with information from the less transaction refined impact analysis repository in the case of a request to insert or delete a table record for tables that do not contain any impacted transaction in the more transaction refined impact analysis repository. And associating the combined repository with information from the less transaction refined impact analysis repository in the case of a request to update a table record for table columns that do not contain any impacted transaction in the more transaction refined impact analysis repository. In step 720, associating the combined repository with a first predefined amount of information from the less transaction refined impact analysis repository in the case of a request to insert or delete a table record for tables that contain less than a second predefined amount of impacted transactions in the more transaction refined impact analysis repository. In step 722, associating the combined repository with a third predefined amount of information from the less transaction refined impact analysis repository in the case of a request to update a table record for table columns that contain less than a fourth predefined amount of impacted transactions in the more transaction refined impact analysis repository. As a non limiting example, the following values may be applied: the first and third predefined amounts equal 4 and the second and fourth predefined amounts equal 2. Optionally, the predefined amounts may be dynamically determined, for example, according to: a predefined logic, predefined settings, and/or environmental conditions.

Figure 4:
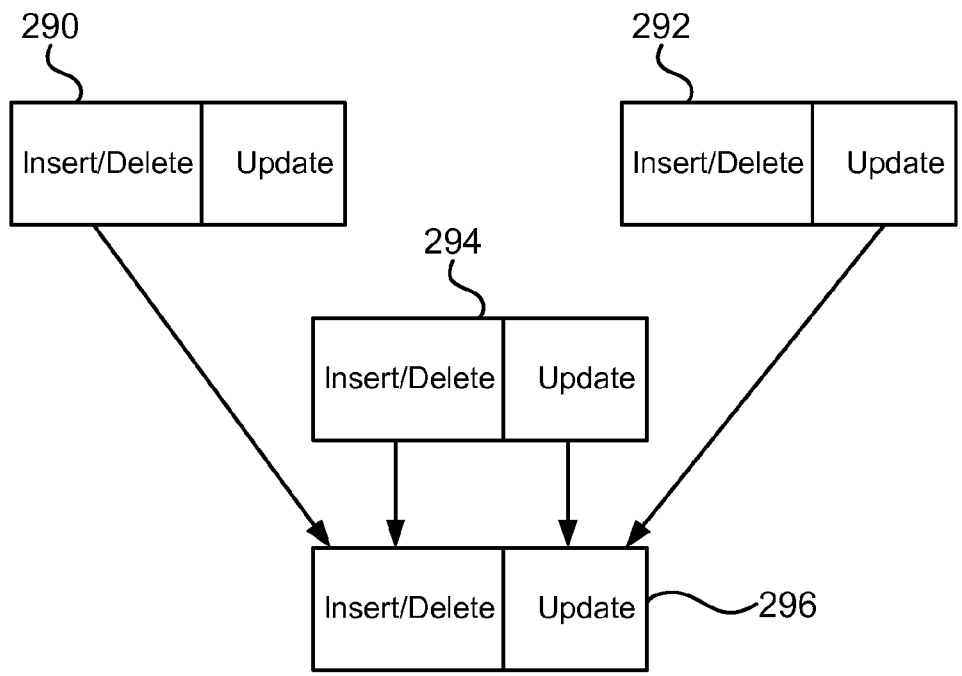
FIG. 4 is an illustration of one transaction-refinement embodiment, in accordance with the present invention.

FIG. 4 illustrates one embodiment including three impact analysis repositories (290, 292, and 294). In this example, impact analysis repository 294 is more transaction refined than impact analysis repository 290 for requests to insert or delete table records. Impact analysis repository 294 is also more transaction refined than impact analysis repository 292 for requests to update table records. The combined impact analysis repository 296 may be calculated as follows.

For each table associated with an impact of a request to insert or delete a table record in either impact analysis repository 290 or impact analysis repository 294, if an impact exists in impact analysis repository 294, then the results from impact analysis repository 294 are copied to the combined impact analysis repository 296; otherwise, the results from impact analysis repository 290 are copied to the combined impact analysis repository 296.

For each table column associated with an impact of a request to update a table record in either of impact analysis repositories 292 or 294, if an impact exists in impact analysis repository 294, then the results from impact analysis repository 294 are copied to the combined impact analysis repository 296; otherwise, the results from impact analysis repository 292 are copied to the combined impact analysis repository 296.

In one embodiment, the combined impact analysis repository includes a list of transactions, and each transaction includes a set of externally-visible output statements impacted in the transaction. The combined impact analysis repository is calculated using the following statement-refinement technique.

Accessing at least two impact analysis repositories, comprising transactions and externally-visible output statements, and obtaining a statement-refinement index for each of the impact analysis repositories. Optionally, a first impact analysis repository is considered to be more statement-refined than a second impact analysis repository if the average number of externally-visible output statements per transaction in the first impact analysis repository is smaller than the average number of externally-visible output statements per transaction in the second impact analysis repository. The statement-refinement index may be calculated separately for the requests to insert or delete table records and for the requests to update table records. Alternatively, the statement-refinement index may include both the requests to insert or delete table records and requests to update table records.

For each transaction impacted by a predefined change request, locate the most statement-refined impact analysis repository containing the impacted transaction, and associate the externally-visible output statements impacted by the impacted transaction with the combined impact analysis repository.

For example, in a case where the statement-refinement index is calculated for both the requests to insert or delete table records and the requests to update table records, if a first impact analysis repository is considered to be more statement-refined than a second impact analysis repository, then for each transaction impacted by either the request to insert or delete a table record or by the request to update a table record, in either of the repositories, if the first impact analysis repository includes the impacted transaction, then the externally-visible output statements impacted by the impacted transaction is copied from the first impact analysis repository to the combined impact analysis repository; otherwise, the externally-visible output statements impacted by the impacted transaction are copied from the second impact analysis repository to the combined impact analysis repository.

Figure 8:
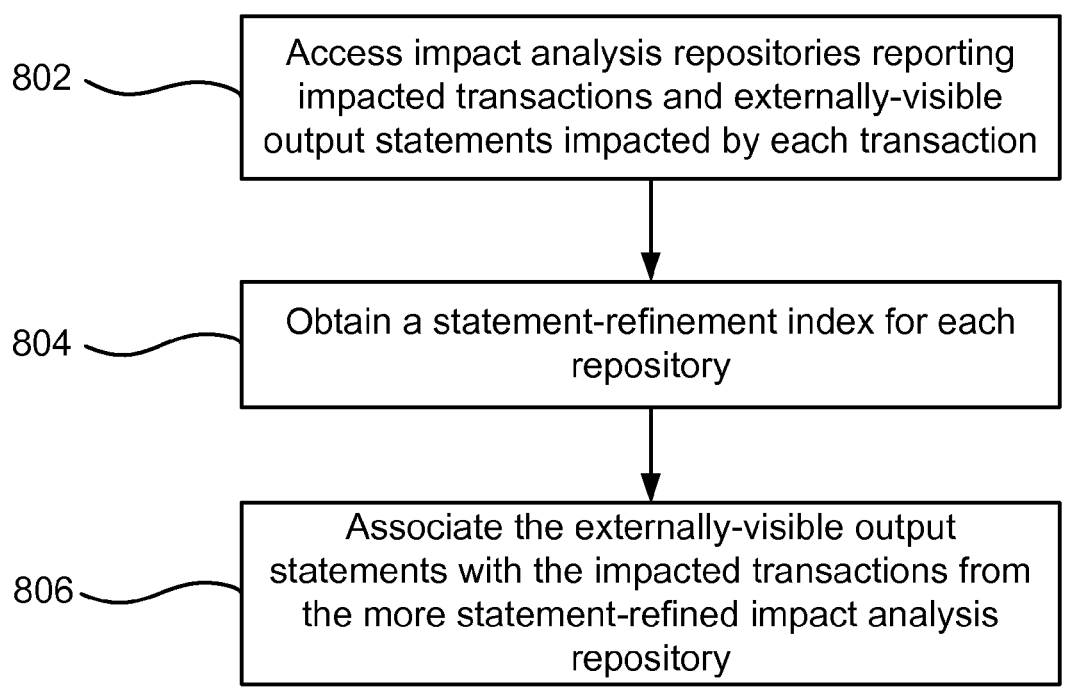

FIG. 8 illustrates one embodiment, including the following steps: In step 802, accessing at least two impact analysis repositories reporting impacted transactions and externally-visible output statements impacted in each transaction. In step 804, obtaining a statement-refinement index for each of the impact analysis repositories. And in step 806 obtaining a combined impact analysis repository by associating, for each transaction impacted by a predefined change request, the externally-visible output statements with the impacted transactions from the more statement-refined impact analysis repository.

Figure 5:
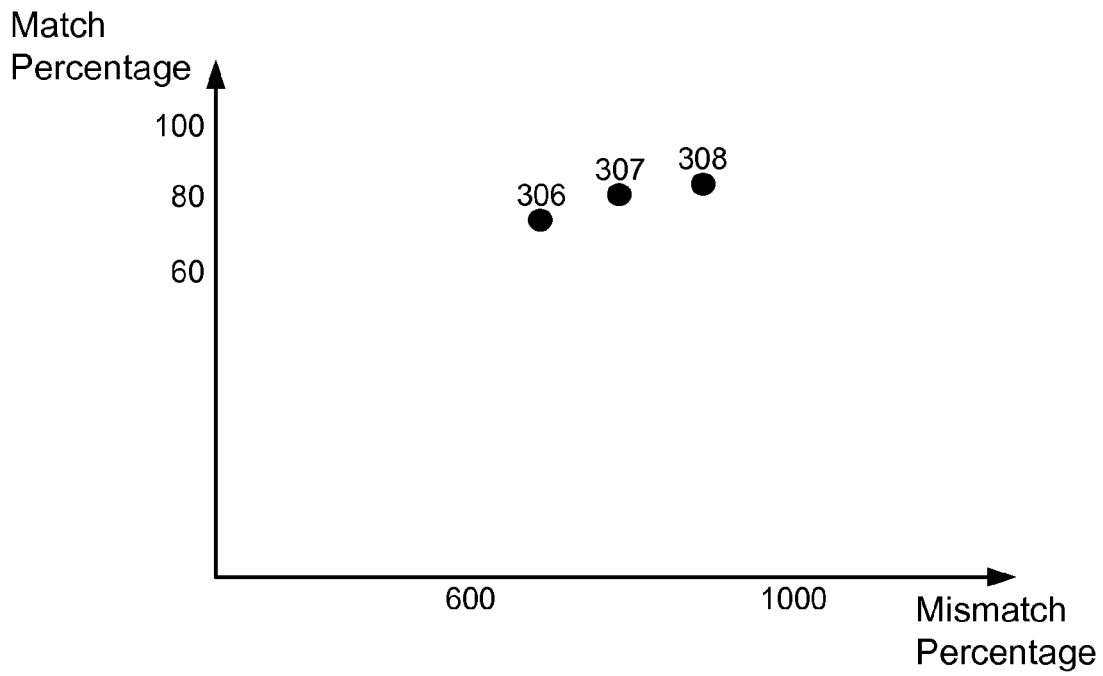
FIG. 5 is an illustration of calculating a high quality combined impact analysis repository, in accordance with one embodiment of the present invention.

FIG. 5 illustrates one embodiment of calculating a high quality combined impact analysis repository, including the following steps:

Running at least two impact analyses.

Each impact analysis outputs a repository of impact analysis results (306, 307, and 308), also referred to as actual results. The expected results are predefined results received from a third party (such as a user, another application, or a run time monitoring application) that are regarded as the correct results of the impact analysis.

In one embodiment, when given a repository of expected results, each impact analysis repository features three indications: (i) The percentage of expected results that actually exist in the impact analysis repository out of the total number of results in the repository, also known as match percentage. (ii) The percentage of the unexpected actual results in the impact analysis repository out of the total number of results in the repository, also known as mismatch percentage or over percentage; the mismatch percentage is calculated as the number of actual results in the repository that are not in the expected results repository divided by the total number of results in the repository. (iii) The ratio between the mismatch percentage and the match percentage, the ratio between the second indicator and the first indicator; in one example, the ratio indicates the average number of redundant results, contained in the impact analysis repository, for every match; the ratio may be calculated for any impact analysis repository and enables the system to compare different impact analysis repositories; the smaller the ratio is, the better the performance of the impact analysis repository for which it is calculated.

Receiving repositories of different impact analyses.

Creating a combined impact analysis repository from the received repositories, whereby the combined impact analysis repository features better quality in relation to each single impact analysis repository. Optionally, the quality of all impact analysis repositories is measured by the ratio of mismatch percentage to match percentage.

It is appreciated that certain features of the embodiments, which are, for clarity, described in the context of separate embodiments, may also be provided in various combinations in a single embodiment. Conversely, various features of the embodiments, which are, for brevity, described in the context of a single embodiment, may also be provided separately or in any suitable sub-combination.

It is to be understood that the embodiments are not limited in their applications to the details of the order or sequence of steps of operation of methods, or to details of implementation of devices, set in the description, drawings, or examples. While the methods disclosed herein have been described and shown with reference to particular steps performed in a particular order, it will be understood that these steps may be combined, sub-divided, or reordered to form an equivalent method without departing from the teachings of the embodiments of the present invention. Accordingly, unless specifically indicated herein, the order and grouping of the steps is not a limitation of the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method comprising: accessing at least two impact analysis repositories comprising transactions; obtaining a transaction-refinement index for each of the impact analysis repositories; according to the obtained transaction-refinement index, associating the combined repository with information from the most transaction refined impact analysis repository; and associating the combined repository with information from the less transaction refined impact analysis repository in the case of a request to insert or delete a table record for tables that do not contain any impacted transaction in the more transaction refined impact analysis repository; and associating the combined repository with information from the less transaction refined impact analysis repository in the case of a request to update a table record for table columns that do not contain any impacted transaction in the more transaction refined impact analysis repository.

2. The method of claim 1, wherein the step of obtaining the transaction-refinement index comprises calculating the transaction-refinement index by comparing the average number of impacted transactions per at least one of the following: database column for requests to update table records, or database table for request to insert or delete table records.

3. The method of claim 1, further comprising the steps of associating the combined repository with a first predefined amount of information from the less transaction refined impact analysis repository for a request to insert or delete a table record for tables that contain less than a second predefined amount of impacted transactions in the more transaction refined impact analysis repository; and associating the combined repository with a third predefined amount of information from the less transaction refined impact analysis repository for a request to update a table record for table columns that contain less than a fourth predefined amount of impacted transactions in the more transaction refined impact analysis repository.

4. A method comprising: accessing at least two impact analysis repositories comprising transactions and externally-visible output statements impacted in each transaction; obtaining a statement-refinement index for each of the impact analysis repositories; and obtaining a combined impact analysis repository by associating, for each transaction impacted by a predefined change request, the externally-visible output statements with the impacted transactions from the more statement-refined impact analysis repository.

5. The method of claim 4, wherein the step of obtaining the statement-refinement indices for the impact analysis repositories comprises calculating the statement-refinement index for the impact analysis repositories by comparing the average number of externally-visible output statements per transaction in each of the impact analysis repositories.

6. The method of claim 4, wherein the predefined change request is a request to update a table record and the step of obtaining the statement-refinement indices for the impact analysis repositories comprises calculating the statement-refinement index for the impact analysis repositories by comparing the average number of externally-visible output statements, per each transaction, affected by the requests to update a table record, in each of the impact analysis repositories.

7. The method of claim 4, wherein the predefined change request is a request to insert or delete a table record and the step of obtaining the statement-refinement indices for the impact analysis repositories comprises calculating the statement-refinement index for the impact analysis repositories by comparing the average number of externally-visible output statements, per each transaction, affected by the requests to insert or delete a table record, in each of the impact analysis repositories.

8. The method of claim 4, further comprising the step of receiving user feedback about the accuracy of the combined impact analysis repository.

9. The method of claim 8, further comprising the step of utilizing the received user feedback for improving the statement-refinement index.

* * * * *